United States Patent [19]

Yabu et al.

[11] 4,304,038

[45] Dec. 8, 1981

[54] METHOD OF MANUFACTURING SMALL-SIZED PRESSURE VESSEL OF SHEET METAL

[75] Inventors: Yoshinori Yabu, Tenri; Toshiaki Nishisaka, Ibaraki; Shuichiro Katoh, Toyonaka; Mitsushi Futamura, Osaka; Masaki Nomura, Amagasaki; Shiro Matsumoto, Yao; Noriaki Hanafusa, Toyonaka, all of Japan

[73] Assignee: Nippon Aluminium Mfg. Co., Ltd., Osaka, Japan

[21] Appl. No.: 56,699

[22] Filed: Jul. 11, 1979

Related U.S. Application Data

[63] Continuation-in-part of Ser. No. 946,421, Sep. 25, 1978, abandoned.

[30] Foreign Application Priority Data

Sep. 26, 1977 [JP] Japan ................................ 52-115743
Oct. 3, 1977 [JP] Japan ................................ 52-119331
Apr. 6, 1978 [JP] Japan ................................ 53-40965

[51] Int. Cl.[3] .......................... B23P 3/00; B23P 25/00

[52] U.S. Cl. ........................................ 29/458; 29/463; 29/469.5; 113/120 S; 156/293; 156/295; 156/304.2; 156/304.5; 220/3; 220/5 A; 285/284; 285/DIG. 16

[58] Field of Search ....................... 29/463, 469.5, 458; 113/120 S; 220/5 A, 5 R, 3, 71; 285/284, DIG. 16; 156/293, 295, 304.2, 304.5

[56] References Cited

U.S. PATENT DOCUMENTS

| | | | |
|---|---|---|---|
| 1,961,117 | 5/1934 | Wall | 113/120 S X |
| 1,966,241 | 7/1934 | Furrer | 220/3 |
| 2,113,060 | 4/1938 | Sandberg | 29/463 UX |
| 2,339,554 | 1/1944 | Kuhn | 220/3 |
| 2,372,290 | 3/1945 | Pawelsky et al. | 220/71 X |
| 2,412,271 | 12/1946 | Kercher | 29/463 UX |
| 2,970,719 | 2/1961 | Brady, Jr. | 29/463 X |
| 3,636,186 | 1/1972 | Sturley | 156/293 X |
| 3,937,641 | 2/1976 | Kushner et al. | 285/DIG. 16 X |
| 4,121,528 | 10/1978 | Amado, Jr. | 113/120 S |

FOREIGN PATENT DOCUMENTS

| | | | |
|---|---|---|---|
| 2304458 | 10/1976 | France | 156/293 |

*Primary Examiner*—Charlie T. Moon
*Attorney, Agent, or Firm*—Wenderoth, Lind & Ponack

[57] ABSTRACT

Small-sized pressure vessels made of sheet metal which are suitable for the storage and carriage of pressurized liquid, pressurized gas and the like are provided herein, and also the method of manufacturing these pressure vessels which comprises in combination a process in which two cup-shaped pieces made of sheet metal are fitted, or a jointing ring made of metal or synthetic resin is fitted to the open end of one of both cup-shaped pieces along its inner or outer circumferential surface, and hot-melting type adhesives are applied to the jointing surface of each cup-shaped piece to which the jointing ring is attached and the jointing ring itself or the open end of the other cup-shaped piece. Also both cup-shaped pieces may be butted or fitted in their open ends in which, for example, one cup-shaped piece which has the jointing ring fitted thereto and the other cup-shaped piece are heated to 120° C.–250° C. to melt the adhesives and are then cooled to solidify the adhesives.

14 Claims, 19 Drawing Figures

METHOD OF MANUFACTURING SMALL-SIZED PRESSURE VESSEL OF SHEET METAL

CROSS-REFERENCE TO RELATED APPLICATION

This is a continuation-in-part of Application Ser. No. 946,421 filed Sept. 25, 1978, now abandoned.

BACKGROUND OF THE INVENTION

1. Field of the Invention

This invention relates to small-sized vessels made of sheet metal which are suitable for the storage and carriage of pressurized liquid, pressurized gas and the like, and also relates to the manufacturing method of these vessels. More particularly, this invention is intended to provide small-sized pressure vessels of light weight and high tenacity at low manufacturing cost, without exerting severe stresses upon the sheet metal of which the vessels are made in the manufacturing process, and which vessels may be manufactured without subjecting the vessels to complicated machining processes.

2. Prior Art

In general, conventional type small-sized pressure vessels of less than 500 ml in capacity and 3 to 4 $kg/cm^2$ in pressure resistivity are made of sheet metal to store and carry pressurized liquids such as carbonated drinking water and the like and also pressurized gases, such as low-pressure oxygen and the like. These vessels are chiefly rectangular in their longitudinal sections and are composed of two component portions made of a cap portion and a shell portion or composed of three component pieces of one cap portion and two shell portions. In order to make the conventional pressure vessel of two pieces, these two pieces are jointed together by means of a double-seaming process. Also, for the conventional three-piece type pressure vessels, the two shell pieces are united together at their seams by means of adhesives or soldering, and thereafter, the double-seaming process is used to circumferentially joint the united shell pieces and the cap piece together with sealing material. Moreover, when a pressure vessel of greater capacity of approximately 500 ml to 10 l is made, the sheet metal of which the pressure vessel is made is required to be increased in thickness according to the increase in the capacity of the pressure vessel. Thus, the pressure vessel is shaped so as to have an oval longitudinal section which is favorable from the viewpoint of the designing of the proper thickness of the material sheet metal used to shape the vessel. However, such a larger-sized pressure vessel does not differ from the foregoing small-sized pressure vessels in respect to jointing the shell pieces to the cap piece at their shoulder portions by the use of a double-seaming process.

The double-seaming process requires a metal plate of high rigidity at the seaming portion. Therefore, the thickness of a metal plate of which such a pressure vessel is made is required to be much greater in the seaming portion than that which is determined on the basis of the internal pressure of the vessel. For example, when a commercially available pressure vessel made of an aluminum alloy for beer has a thickness of approximately 0.55 mm in its bottom plate, it is required to have a thickness of approximately 0.7 mm in its upper shell plate. For this reason, the double-seaming construction of a pressure vessel requires an excessive amount of material, thereby increasing the manufacturing cost and the weight of an obtained pressure vessel. At the same time, the double-seaming construction has the decided disadvantage of reducing the cooling efficiency of, for example, a beverage within the pressure vessel. Furthermore, vessels produced by the double-seaming construction method have various serious disadvantages in that the pressure resistivity is limited to approximately 4 $kg/cm^2$ as stated in the foregoing description, the sealing property is unstable, and a great number of machining steps are required to produce the vessel.

SUMMARY OF THE INVENTION

It is an object of the present invention to produce small-sized vessels of 500 ml to 10 lt. in capacity in which a pressure resistivity of approximately 3 to 6 $kg/cm^2$ is required without utilizing the double seam construction method and its attendant disadvantages. It is a further object to produce small-sized pressure vessels of light weight and high tenacity simply and rapidly, limited in their overall wall thickness to 0.2–0.6 mm as required minimum thickness, and which vessels are also comprised of joints furnished with sufficient strength and high sealing properties.

According to the present invention, in order to prevent the material sheet metal from undergoing physical fatigue, such as formed by the seaming process, two cup-shaped component pieces which are respectively formed of sheet metal into cylinders provided with curved bottoms are united in their open ends into a single unit relation by the use of adhesives, thereby allowing the manufacture of small-sized pressure vessels.

In a preferred embodiment, a sheet metal of 0.2 mm to 0.6 mm in thickness to which is applied a suitable resin containing a minute amount of wax is formed into cylinders provided with curved bottoms to obtain said two cup-shaped pieces and the two pieces are joined together as previously mentioned. A pressure vessel thus obtained is provided with a vent of pressurized liquid or gas to be contained therein by forming the vent on one of the two cup-shaped pieces before they are united or on any desired portion of the vessel obtained after the two pieces have been united.

DETAILED DESCRIPTION OF THE PREFERRED EMBODIMENTS

Figure 1:
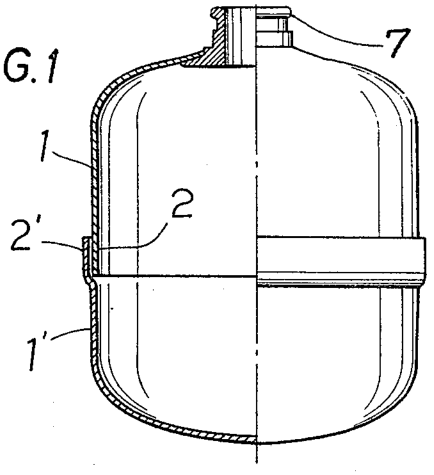
FIGS. 1 to 10 are fragmentary longitudinal sectional elevations of small-sized pressure vessels manufactured in accordance with the present invention.
Figure 2:
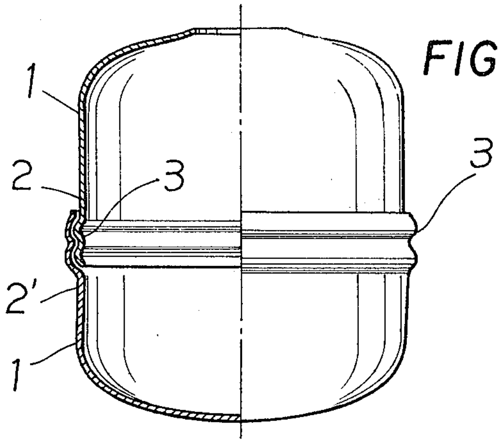

One of two cup-shaped pieces 1 and 1' press-formed of sheet metal as shown in FIG. 1 is expanded or contracted in its open end 2 or 2' and is adjusted in diameter so that one piece can be tightly fitted into the other piece. Then, an adhesive, for example a hot-melting type polyamide adhesive is applied to the contact surfaces of both pieces, and both pieces are tightly engaged with each other. Thereafter, the open end portions of both pieces are heated so that molten adhesives bring them into cohesion with each other. Subsequently, the open end portions of both pieces are cooled to solidify the adhesives and joint both pieces into a single unit relation, thereby allowing the completion of a small-sized vessel. In this case, if the open end portions of the two cup-shaped pieces 1 and 1' tightly engaged with each other are pressed when heated to melt the adhesives, the cohesive effect between both open ends can be increased. Moreover, if the open ends are respectively formed with circumferential undulated portions 3 and are then engaged with each other through the adhesives, the cohesive effect between both open ends can be even further increased.

Figure 3:
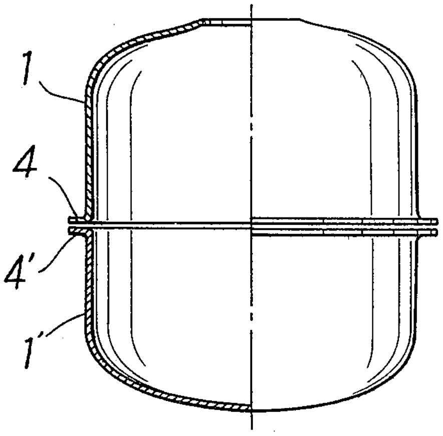

Also, the open ends of the foregoing two cup-shaped pieces 1 and 1' may be bent at right angles in the outer-circumferential direction, as shown in FIG. 3 to form flanges 4 and 4', and these flanges 4 and 5' are fitted together into close contact with each other through the adhesives. The flange portions are further pressed while being heated, and thereafter, they are cooled to solidify the adhesives so that they are jointed into a single unit relation. In this case, the flanges 4 and 4' may be undulated on their surfaces before or at the same time when they are pressed while being heated, or the flanges 4 and 4' fitted together may be spot-welded, whereby the cohesion between the flange surfaces can be improved.

Figure 4:
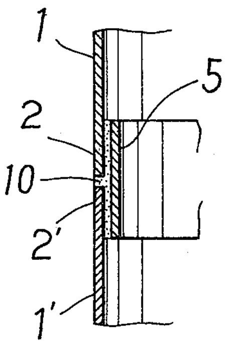
Figure 5:
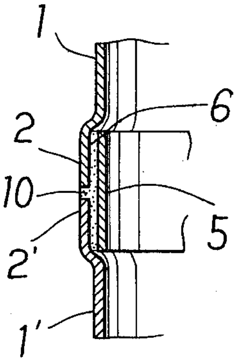
Figure 19:
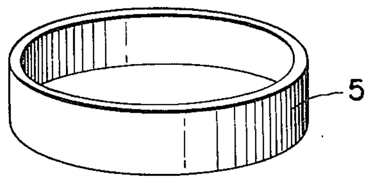
FIG. 19 is an elevated side perspective view of a jointing ring to be used in the present invention.

Furthermore, instead of forming the flanges 4 and 4' as described above, it is feasible to fit into the inner circumferential surfaces of the open ends 2 and 2' of the cup-shaped pieces 1 and 1' both ends of a jointing ring 5 made of metal, synthetic resin or the like, butt the open ends 2 and 2' of both pieces, and bring the jointing ring into cohesion with the butted ends and each cup-shaped piece by means of adhesives 10, as shown in FIG. 4. Most preferably, a single continuous and metallic jointing ring 5 coated on its surface with a primer of a suitable synthetic resin as shown in FIG. 19 is used as the jointing ring.

However, in order to achieve the cohesion of the two cup-shaped pieces by the use of adhesives instead of the double-seaming construction, sufficient axial strength is required in the jointing portion, which axial strength is expressed by $(P \times D/4)$ kg/cm$^2$ in which P=Internal Pressure (kg/cm$^2$) and D=Outside Diameter (cm). Also, good sealing properties such as air-tightness, water-tightness and the like are required at the jointing portion. Since the cohesion between the upper and the lower cup-shaped piece usually acts as shearing force because the internal pressure of the vessel creates tension, the jointing portion must be strong. However, sufficient jointing pressure can ordinarily not be loaded upon the jointing portion. As a result, stable sealing properties can not be obtained. Also, when the flanges formed on the open ends of the two cup-shaped pieces in the perpendicular direction of these open ends are fitted together, sealing properties can be obtained, because sufficient jointing pressure can be loaded upon the flange surfaces, while on the other hand, a stable jointing strength can not be obtained with cohesion exfoliating force in the only form of which an axial stress acts in the jointing portion. As examples of the exfoliating strength, setting reaction type epoxy adhesives and neoprene-rubber adhesives were respectively found to have exfoliating strengths at approximately 1 kg/cm and approximately 5 kg/cm. Moreover, polyamide adhesives were found to have a maximum exfoliating strength of 10 to 15 kg/cm when used for a primer-treated metal surface under conditions which make it possible to joint the metallic pieces on an industrial manufacturing base, except for any special limited conditions. Incidentally, the side portion of a commercially available can for food which is seamed by means of polyamide adhesives has a cohesive force (exfoliating strength) of 4 to 7 kg/cm.

A vessel of, for example, 20 cm in outside diameter and 4 kg/cm$^2$ in internal pressure requires an axial strength of 20 kg/cm. Therefore, if this vessel is made by jointing the flanges of its two component pieces by means of adhesives, it is to be understood from the foregoing description of the adhesives that it is difficult to impart stable jointing strength to the vessel.

Figure 6:
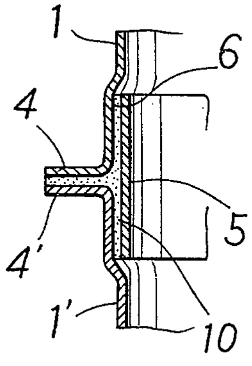
Figure 7:
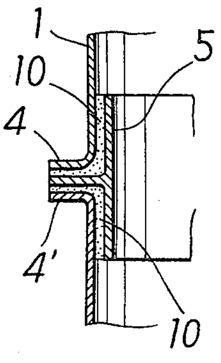

The present invention is concerned with greatly improving the cohesive force (exfoliating strength) of the jointing portion and simultaneously to obtain sufficient sealing properties in the jointing portion. Two cup-shaped pieces 1 and 1' in which their jointing portions are respectively machined into flanges 4 and 4' each provided with an arched surface of a suitable radius in their curved corners, as shown in FIGS. 6 and 7 are jointed together by fitting the flanges 4 and 4' together to form a sectionally triangular annular spacing by means of the inside circumferential surface of the flanges fitted together and a jointing ring 5. If adhesive 10 is inserted and solidified in this annular spacing, an adhesive joint of great thickness can be produced which insures great sealabilities and high cohesive force (exfoliating strength) between the flanges 4 and 4', and also which assures high cohesive force between the cup-shaped pieces 1, 1' and the jointing ring 5, because the shearing force acts against the axial stresses by means of tension which can be caused by the internal pressure of a pressure vessel thus obtained.

The strength of the adhesive joint thus formed will now be detailed in comparison with a mere flange joint.

When two cup-shaped pieces made of an aluminum alloy plate treated with a primer were jointed in the surfaces of their flanges protruded at right angles to the cup-shaped pieces, by means of a thin coat of polyamide adhesives based upon dimer acid and without the use of a jointing ring, the cohesive force (exfoliating strength) of the jointed flange surfaces was usually not more than 10 to 15 kg/cm, while on the other hand, the cohesive force could be raised to 20 to 25 kg/cm by increasing the coating of the adhesives to 1–5 mm.

Moreover, when the contact portions of the flanges with the cup-shaped pieces were only rounded to a radius of approximately 3 mm, the axial strength of the jointed portion was approximately 15 kg/cm. Also, in these cases, a stable layer of adhesives could not be formed inside the rounded contact portions of the flanges with the cup-shaped pieces, because a jointing ring was not used.

Furthermore, when a sectionally triangular annular spacing was formed inside the rounded contact portions of the flanges with the cup-shaped pieces by using a jointing ring to insert the adhesives in this spacing, the strength of the joint thus obtained was improved to 28 kg/cm.

On the other hand, when the adhesives were extended between the cup-shaped pieces 1, 1' and the jointing ring 5 according to the present invention, the shearing force exerted on this portion was such as to multiply the stable exfoliating strength of the jointing portion such that the strength of the jointed portion was further increased to 45–70 kg/cm.

The strength of each adhesive joint described above was compared with pressure strength by subjecting real products of 7 lit. in capacity and 20 cm in outside diameter to water-pressure tests. The following are test results:

When the contact portion of the flanges with the cup-shaped pieces were rounded to a radius of 3 mm, the jointed portion was ruptured at a water pressure of 2 to 3 $kg/cm^2$. When the adhesives were inserted in the triangular annular spacing precisely formed by the rounded portion and the jointing ring, the jointed portion was ruptured at a water pressure of 4.5 $kg/cm^2$. The jointed portion in which the adhesives were extended between the cup-shaped pieces and the jointing ring according to the present invention has no abnormality such as breakage against a water pressure of 6.0 $kg/cm^2$. Incidentally, a conventional vessel made by means of the double-seaming construction was ruptured at a water pressure of 4.2 $kg/cm^2$. Steel or stainless steel as well as an aluminum alloy can be used for the material metal of which the small-sized pressure vessel of the present invention is made.

Any of the aforementioned metals should be coated on its surface with a suitable primer of synthetic resin such as a vinyl chloride resin, epoxy resin or a phenol resin which contains a minute amount of wax. The primer coating of the metal produces three effects. The first effect is that the sheet metal of the pressure vessel thus obtained is protected from corrosive surroundings both inside and outside the vessels. Therefore, in the case of a pressure vessel made of, for example, an aluminum alloy, it is unnecessary to subject the pressure vessel to an alumilite treatment, thereby achieving a decrease in the manufacturing cost. The second effect is that a stable adhesion of adhesives to the sheet metal is ensured. The third and most important effect is that sheet metal of 0.2 mm to 0.6 mm in thickness can be deep-drawn without any lubricant. This effect results from the fact that the self-lubricity of the sheet metal can be effectively used, which is provided by means of the wax contained in the primer applied to the sheet metal. As a result, a washing process to remove the lubricant is not required after the sheet metal has been deep-drawn, thereby allowing a decrease in the manufacturing cost in addition to the reduction of the material cost which is effected by minimizing the thickness of the sheet metal. Moreover, the third effect of the primer coating of the material sheet metal ensures the production of a vessel, suitable for use as a foodstuff container, because it is press-formed without any lubricant, as described in the foregoing. Also, the adhesives are desired to be of a hot-melting type which has excellent melting fluidity and suitable strength. For example, polyamide adhesives are suitable. The jointing ring suffices for accomplishing the foregoing object of the present invention if it has properties which answer the purposes of forming a spacing between it and the cup-shaped pieces, bringing the adhesives into cohesion with the cup-shaped pieces, and also allowing a shearing force to act upon the jointing portion as a result of the tension exerted by the internal pressure of the vessel. Therefore, the jointing ring may be made of a synthetic resin such as vinyl chloride as well as metal and also may be circumferentially provided with a single or a plurality of recessions to enlarge the contact area of the adhesives therewith so that the strength of the jointing portion can be improved. Moreover, FIGS. 8 to 11 show the modifications of the embodiments illustrated and described above, and any modification can raise the cohesive effect of the adhesives, as is detailed below.

As is apparent from the foregoing description, the present method fits the single jointing ring 5 between the open ends 2 and 2' of the two cup-shaped pieces made of sheet metal or into a spacing between these open ends, and fills or applies adhesives 10 between these open ends or into the entire spacing between these open ends and between this spacing and the open ends of both cup-shaped pieces, and melts and solidifies the adhesives to joint both cup-shaped pieces directly or through the jointing ring 5 into a single unit relation, whereby the axial and circumferential cohesive areas can be greatly increased against axial stresses usually exerted upon a pressure vessel, while at the same time, an adhesive joint of great thickness can be formed. Therefore, the joint of the present invention can guarantee high cohesion and great sealability.

For example, a vessel of 20 cm in outside diameter and 4 kg/cm in internal pressure generally requires an axial strength of approximately 20 kg/cm. In a commercially available can, the cohesive force (exfoliating strength) of its seamed side is 4 to 7 kg/cm, while on the other hand, the pressure vessel in which the present invention is embodied as described above has an extremely high cohesive force of 46 to 100 kg/cm in its jointed portion. Also, a pressure vessel of 7 lt. in capacity and 20 cm in outside diameter which is constructed in its jointed portion according to the present invention has a pressure resistivity of 8 $kg/cm^2$, whereas conventional pressure vessels of double-seamed construction have a pressure resistivity of no more than 4.0 $kg/cm^2$. This comparative example shows that the present invention can provide a pressure vessel in which the jointed portion has two to five times the strength of a conventional double-seamed portion.

The manufacturing method of the small-sized pressure vessels of the present invention comprises in combination a process in which two cup-shaped pieces made of sheet metal are fitted or butted, or a jointing ring made of metal or synthetic resin is fitted to the open end of one of both cup-shaped pieces along its inner or outer circumferential surface, a step of applying hot-melting type adhesives to the jointing surface of each cup-shaped piece or the open end of one cup-shaped piece to which the jointing ring is attached and the jointing ring itself or the open end of the other cup-shaped piece, a process in which the two cup-shaped pieces are butted or fitted in their open ends, and a process in which one cup-shaped piece which has the joint ring fitted thereto and the other cup-shaped piece and are heated to 120° C.–250° C. to melt the adhesives and are then cooled to solidify the adhesives. When a series of these processes are used to manufacture the small-sized pressure vessels of the present invention, both cup-shaped pieces which have the open ends of the same or different shapes as shown in FIGS. 1 to 10 are united together by jointing into a single unit relation the open ends directly or through the single jointing ring by means of adhesives. Pressure vessels thus obtained have a variety of outside shapes. The material metal of which the cup-shaped pieces are made may be an aluminum alloy, stainless steel or any other steel of, for example, 0.2 to 0.6 mm in thickness.

Figure 8:
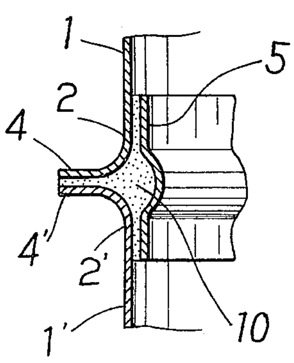
Figure 9:
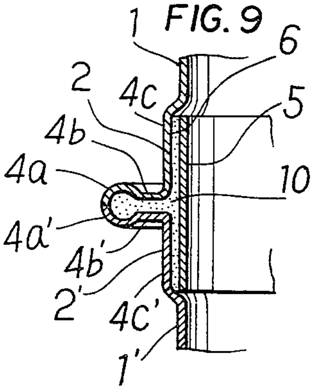
Figure 11:
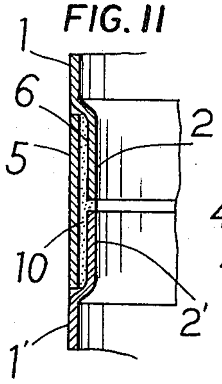
FIGS. 11 to 16 are fragmentary enlarged longitudinal sectional views showing the manufacturing processes.
Figure 12:
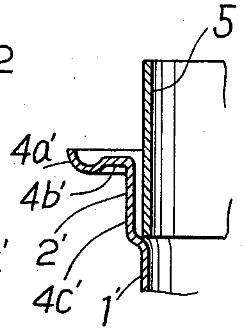

Each process for making these vessels will now be described. In the case of the vessels of such adhesive joints as shown in FIGS. 4 to 10, the jointing ring 5 made of metal or synthetic resin is fitted to the inner circumferential surface of the open end of one of the upper and the lower cup-shaped pieces, and for the vessels provided with such an adhesive joint as illustrated in FIG. 11, the jointing ring 5 is attached to the outer circumferential surface of the open end of one or both cup-shaped pieces. If the vessel of the adhesive joint shown in FIG. 9 is made, the jointing ring 5 is fitted as illustrated in FIG. 12 so that a slight clearance is formed between the jointing ring and the cup-shaped pieces. A material of which this jointing ring is made may be a synthetic resin such as vinyl chloride as well as a metal, which is furnished with properties such that the molten hot-melting type adhesives can be applied or filled between the cup-shaped piece and the jointing ring without flowing out and also that the adhesives can be brought into cohesion with the cup-shaped piece to create a shearing force caused by the tension caused by the internal pressure of the vessel. Also, a sectional shape of the jointing ring may be concave as illustrated in FIG. 8 as well as being flat. As described above, the jointing ring is fitted to either the upper or the lower cup-shaped piece. In general, it is preferred that the lower cup-shaped piece has the jointing ring fitted. However, if a venting member of a pressurized liquid or gas is fixed on the lower cup-shaped piece by means of adhesives, it is possible that the complete fixation of the venting member may be prevented, because the fixing adhesives are melted when the lower cup-shaped piece is heated to melt the adhesives between it and the jointing ring. In this case, needless to say, the jointing ring is to be fitted to the upper piece.

Figure 13:
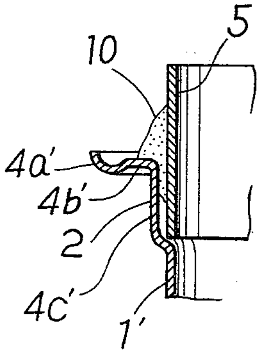
Figure 14:
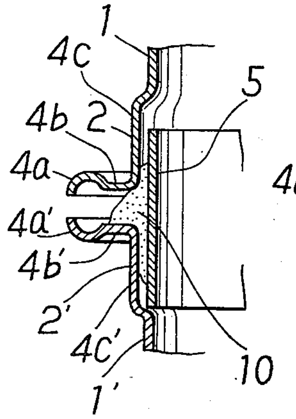
Figure 15:
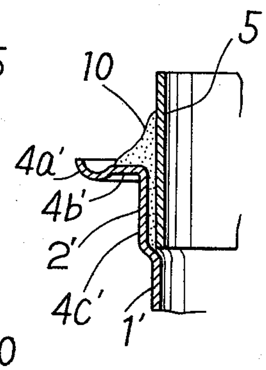

The hot-melting type adhesives are applied to the open end of the upper or the lower piece which has the jointing ring fitted and the jointing ring, or in addition to these portions the adhesives are applied to the open end of the cup-shaped piece to which the jointing ring is not fitted. Alternatively, the adhesives are applied to the open end of one cup-shaped piece which does not have the jointing ring fitted, instead of the jointing ring, provided that the adhesives are applied to the other cup-shaped piece to which the jointing ring is attached. For example, in the case of the vessel of the joint shown in FIG. 9, the adhesives are applied as illustrated in FIG. 13. In the pressure vessel of the present invention, the adhesives are inserted and solidified in a spacing formed between the cup-shaped piece and the jointing ring fitted to this piece, to thereby improve the strength of the joint thus obtained. In this view, the adhesives are preferably applied to the jointing ring and the open end of the cup-shaped piece which has this jointing ring fitted, and the application of the adhesives to these portions can form a joint of sufficient strength. When the adhesives are applied, the open end of the cup-shaped piece and the jointing ring are at ambient temperatures, or are heated to 120°–250° C., depending upon a manner in which the adhesives are applied as specified in the preceding process. The hot-melting type adhesives employed in this process are required to have excellent melting fluidity and adequate cohesive strength. In general, polyamide adhesives are suitable. For example, the adhesives are such that both cup-shaped pieces, either of which does not have the jointing ring fitted, can be fitted together in their open ends after the adhesives have been applied to the open end, or one cup-shaped piece can be easily attached to the outer circumferential surface of the jointing ring fitted into the other cup-shaped piece, as shown in FIG. 14 for the vessel of the joint illustrated in FIG. 9, if the adhesives are applied in advance to the jointing ring and the other cup-shaped piece which has the jointing ring fitted. In this case, the cup-shaped pieces and the jointing ring are at ambient temperature. If both cup-shaped pieces and the jointing ring are heated to 120° C.–250° C., and thereafter have the adhesives applied, pressure is exerted upon both pieces to butt or fit their open ends together, as shown in FIGS. 4 to 11 while the adhesives are melted. This allows the adhesives to fill a spacing between the jointing ring and the open ends of both cup-shaped pieces through the adhesives. Moreover, if one cup-shaped piece which has the jointing ring fitted and also the other cup-shaped piece are heated to 120° C.–250° C., it serves to melt the adhesives before or after they are applied to both cup-shaped pieces, or provided that the adhesives are applied to both pieces and the jointing ring at an ambient temperature, whereby the filling operation of the adhesives into the spacing between the jointing ring and both pieces can be achieved. For the vessel of the joint shown in FIG. 9, this is best illustrated in FIG. 15.

In order to heat both pieces and the jointing ring, high-frequency induction heating or heating using a hot plate or a furnace can be employed. From these heating methods, the most suitable method is selected according to the shape of the jointing portion of the vessel. When the open ends of both pieces are outwardly protruded in the form of flanges, such as in FIGS. 6, 8 and 9, any heating method can be used. However, when as shown in FIGS. 4, 5, 10 and 11, the jointing portions of both pieces are so formed that it is difficult to support each other on their circumferential surfaces, high-frequency induction heating or heating using a furnace is desired. These two heating methods may also be used as preheating means or for re-heating to improve the cohesion of the adhesives. The foregoing three kinds of heating methods can be used in combination.

If one cup-shaped piece in which the venting member for the pressurized liquid or gas is provided in advance by means of adhesives so as to form the cup-shaped pieces and the jointing ring into a single unit relation is heated, there is a risk that a furnace-type heating method would melt the adhesives used and solidify them to connect the venting means with the cup-shaped piece, because this heating method heats the whole surface of the cup-shaped piece. Therefore, if both cup-shaped pieces are heated to connect them together, by locating in a lower position one cup-shaped piece provided with the venting member, the adhesives which secure the venting member drop down, and as a result, a sufficient fixation of the venting member may be prevented, and it is prevented still more when the adhesives are thermoplastic. Therefore, when the cup-shaped pieces are heated by using a furnace, it is desired that one cup-shaped piece provided with the venting member is arranged in a lower position and has the jointing ring fitted into its open end, or that thermosetting type adhesives or adhesives of higher melting point than the hot-melting type adhesives used to joint both pieces be used to connect the venting member with the cup-shaped piece. Also, if the hot-melting type adhesives used for jointing both pieces are applied to the venting member, and the venting member is merely inserted into one cup-shaped piece and is passed through a heating furnace, then the venting member can be brought into cohesion with the cup-shaped piece at the same time when both cup-shaped pieces are cohesively jointed together. Moreover, the venting member can be integratedly secured in advance to one cup-shaped piece by the use of hot-melting type adhesives.

The hot-melting type adhesives melted at the jointing portion formed by means of the open ends of both cup-shaped pieces and the jointing ring are solidified by means of water cooling, forced air cooling, other type cooling and the like while both cup-shaped pieces or the jointing portion is simply supported or slightly pressed, whereby small-sized pressure vessels can be manufactured which have both cup-shaped pieces coupled with the jointing ring into a single unit relation, as shown in FIGS. 4 to 11.

The following examples are illustrative of the present invention.

EXAMPLE 1

A small-sized pressure vessel was formed of a joint which had a sectional shape as shown in FIG. 9, by the use of the following manufacturing method.

Figure 16:
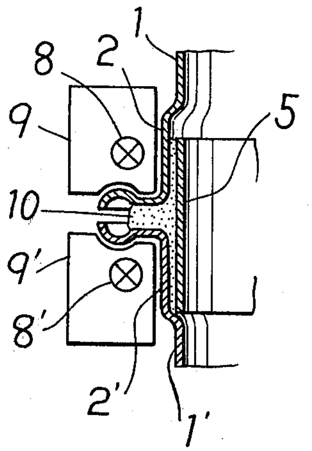
Figure 17:
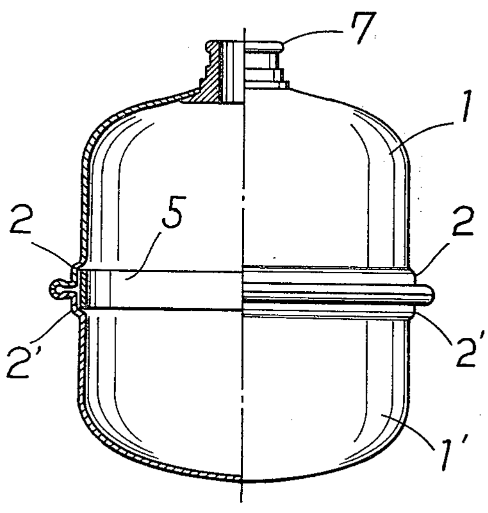
FIGS. 17 and 18 are fragmentary longitudinal sectional elevations of the pressure vessels of the present invention.

An aluminum alloy sheet was chemically coated on a single surface in advance with chromic acid to improve the adhesion of adhesives to its single surface, and thereafter, epoxy phenol adhesives were applied to the pre-coated surface of the aluminum alloy sheet to form a resin film (primer) of 5 microns in thickness on the pre-coated surface of the aluminum sheet by means of baking. Subsequently, this aluminum sheet was deep-drawn into two cup-shaped pieces, with its filmed surface turned inside so that the open ends 2 and 2′ of the two cup-shaped pieces had their circumferential edges formed into outwardly protruding flanges **4*b* and 4*b*′ which had semi-circular recesses 4*a* and 4*a*′ in their peripheries and raised portions 4*c* and 4*c*′ were formed on the inner circumferential surfaces of the open ends which are spaced apart from the flange surfaces, while at the same time, the ends of these raised portions were rounded at a suitable radius so as to connect to the flange surfaces. One of these two cup-shaped pieces was provided with a hole in its bottom and a venting member 7 made of vinyl chloride resin was secured in this hole by means of hot-melting type adhesives, to thereby form an upper component piece 1 of an intended pressure vessel. The other cup-shaped piece was a lower component piece 1′. Furthermore, a jointing ring 5 was made of the same kind of aluminum alloy plate as both cup-shaped pieces were made of so that the filmed surface of the aluminum alloy sheet was turned outside. Thereafter, this jointing ring 5 was fitted into the raised portion 4*c*′ of the open end 2′ of the lower component piece 1′. In this case, the jointing ring 5 was half protruded from the surface of the flange 4*b*′ of the lower piece 1′, and a clearance was formed between the outer circumferential surface of the jointing ring and the inner circumferential surface of the raised portion of the lower open end. Hot-melting type polyamide adhesives 10 based upon dimer acid were then melted at 180° C., and the molten adhesives were applied to the surfaces of the flanges 4*b* and 4*b*′ and to a corner portion formed by means of the jointing ring 5 fitted into the lower piece 1′ and the flange 4*b*′. Subsequently, the raised portion 4*c* of the open end 2 of the upper piece 1 was partially fitted along and to the outer circumferential surface of the jointing ring 5 so as to be opposed to the surface of the flange 4*b*′ of the lower piece 1′, whereby the upper piece 1 was temporarily assembled with the lower piece 1′. Thereafter, the flange portions of the upper and the lower piece were pressed by means of an upper ringed die 9 and a lower ringed die 9′ made of Bakelite which had high-frequency induction coils 8 and 8′ embedded, as illustrated in FIG. 16, while at the same time, the open ends 2 and 2′ of the upper piece 1 and the lower piece 1′ were heated to 250° C. by the use of the high-frequency induction coils to melt the foregoing hot-melting type adhesives 10 by means of heat transmission from the open ends 2 and 2′ heated. As a result, the adhesives filled a spacing formed between the jointing ring 5 and the flanges 4*b* and 4*b*′ and the raised portions 4*c* and 4*c*′ of both component pieces 1 and 1′. With such arrangement, high-frequency induction heating was stopped, and the adhesives were kept intact for 2 seconds to cool and solidify them, whereby a joint as shown in FIG. 9 could be obtained to allow the manufacturing of a small-sized pressure vessel of sheet metal which had a shape as shown in FIG. 17**. It is parenthetically remarked that in general, the high-frequency induction heating method can heat metal momentarily and partially, while at the same time, this heating method can rapidly transmit the heat of a heated portion to other portions connected to the heated portion. Therefore, it is to be understood that the adhesives heated through the cup-shaped pieces by means of this high-frequency induction heating method are really cooled and solidified. The pressure vessel thus obtained was found to hold intact against a water pressure of 10 $kg/cm^2$ and to exhibit no abnormality in its joint.

EXAMPLE 2

Figure 10:
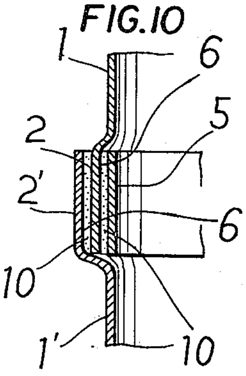

Another small-sized pressure vessel of sheet metal was formed of a joint which had a sectional shape of FIG. 10, by the use of the following manufacturing method.

Figure 18:
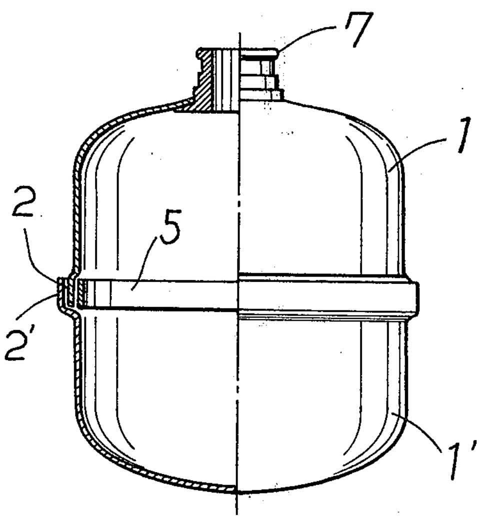

An aluminum alloy plate of small thickness was chemically coated on its both surfaces in advance with chromic acid to improve the adhesion of the adhesives to its both surfaces, and thereafter, epoxy urea adhesives were applied to the pre-coated surfaces of the aluminum alloy plate to form a resin film (primer) of 5 microns in thickness on each pre-coated surface of the aluminum alloy plate by means of baking. Subsequently, this aluminum alloy plate was press-formed into a cup-shaped piece 1 which was small in the diameter of its open end 2 and a second cup-shaped piece 1′ which was large in the diameter of its open end. The cup-shaped piece 1 was provided with a hole in its bottom end and a venting member 7 made of vinyl chloride resin was secured in this hole by means of hot-melting type adhesives. Furthermore, after a jointing ring 5 made of an aluminum alloy sheet was fitted into the open end 2 of the cup-shaped piece 1′, hot-melting type polyamide adhesives based upon dimer acid were melted and molten adhesives 10 were applied into a spacing formed between the inner surface of the open end 2′ and the outer surface of the jointing ring 5 to fill the spacing. Thereafter, the cup-shaped piece 1′ was passed over 30 seconds through an electric furnace in which the temperature of the furnace atmosphere was kept at 200° C., to heat this cup-shaped piece 1′ and the jointing ring 5 to 180° C. or above and melt the adhesives. The open end 2 of the other cup-shaped piece 1 was inserted into the molten adhesives in the spacing between the open end 2′ and the jointing ring 5. Moreover, the assembled portion of both cup-shaped pieces 1 and 1′ was subjected to forced air cooling to cool and solidify the adhesives, whereby a small-sized pressure vessel of an external shape as shown in FIG. 18 could be manufactured of sheet metal and by the use of the joint of a sectional shape as shown in FIG. 10. The pressure vessel thus obtained was found to be sufficiently resistant against water pressure of 10 kg/cm$^2$ and to have no abnormality in its joint.

What is claimed is:

1. A method of manufacturing a small-sized pressure vessel made of sheet metal which comprises coating at least one side of a metal sheet with a primer of a synthetic resin 4.00 containing a minute but effective amount of wax to impart lubricity to the coated sheet metal; press-forming the coated sheet metal into two cup-shaped component pieces in such a manner that at least the inside surfaces of the cups are coated with the primer coating; fitting or butting together the open ends of the cup-shaped component pieces by means of adhesives which melt at a temperature between 120° and 250° C.; heating and pressing the open ends of the two cup-shaped pieces together to bring them into cohesion with each other, said heating being between 120° and 250° C., sufficient to melt the adhesives; and cooling the open ends to solidify the adhesives, whereby both cup-shaped pieces are joined together in their open ends so as to be formed into a single unit relationship.

2. A method according to claim 1, in which the two cup-shaped pieces are bent in the outer circumference direction to form flanges, and these flanges are brought into cohesion with each other through said adhesives, pressed while being heated, and thereafter cooled to solidify the adhesives.

3. A method according to claim 1, in which both ends of a single jointing ring are respectively fitted into each open end of both cup-shaped pieces along its inner circumference by means of said adhesives, and the open ends of both cup-shaped pieces are heated and thereafter cooled to solidify the adhesives.

4. A method according to claim 3 in which each cup-shaped piece and said jointing ring are fitted together through adhesives in a recession formed in the inner circumferences of the open ends of both cup-shaped pieces so as to be adapted for the width and thickness of the jointing ring.

5. A method according to claim 4 in which a protrusion of suitable length is provided in the central portion of the outer circumference of the jointing ring, said protrusion being between the open ends of both cup-shaped pieces and whereby the adhesives are filled in spaces formed at both sides of the protrusion and also the space formed between the outer circumference of the jointing ring and the inner circumference of the cup-shaped open ends to firmly affix the cup-shaped pieces to each other.

6. A method according to claim 5 in which the open ends of both cup-shaped pieces are bent in the outer circumferential direction to form flanges and wherein said protrusion on the jointing ring are interposed between the flanges of both cup-shaped pieces and the open ends are jointed together through the jointing ring by means of said adhesives.

7. A method according to claim 3 in which the circumferential edge of each open end of both cup-shaped pieces are protruded outwardly to form a raised portion from the outer wall surface of the cup-shaped piece and also a semi-circular portion in the periphery of the open end, wherein a jointing ring is inserted between both raised portions of the two open ends and whereby said adhesives are filled into a spacing formed between the jointing ring and the raised portion and also the space formed by the semi-circular portion and the open ends heated to melt the adhesives, pressed and thereafter cooled to solidify said adhesives and firmly affix the two cup-shaped pieces to each other.

8. A method according to claim 3 in which the open end of one cup-shaped piece is formed so as to have a larger diameter than the open end of the other cup-shaped piece and wherein a jointing ring having a diameter slightly smaller than the diameter of the smaller cup-shaped piece open end is inserted into the open end having a larger diameter; said adhesives are filled in the space between the jointed ring and the inner periphery of the larger diameter open end and melted and the smaller diameter cup-shaped piece is inserted into the molten adhesive in the space between the jointing ring and the inner wall of the larger diameter open end and the assembly cooled to firmly affix the cup-shaped pieces to each other.

9. A method according to claim 1 in which a venting member made of metal or synthetic resin is provided in a predetermined portion of one of the cup-shaped pieces.

10. A method according to claim 3 in which the cup-shaped pieces are coated on both sides with said primer synthetic resin and said jointing ring is made of a metal coated with a synthetic resin.

11. A method according to claim 3 in which the jointing ring is a single continuous metallic jointing ring coated on its surface with a synthetic resin.

12. A method according to claim 1 in which said sheet metal has a thickness ranging from 0.1 mm to 0.6 mm.

13. A method according to claims 1 or 12 in which the sheet metal used to manufacture the pressure vessel is made of an aluminum alloy.

14. A method according to claim 12 in which the synthetic resin used as a primer to coat the metal sheet is selected from the group consisting of a vinyl chloride resin, an epoxy resin and a phenol resin; and the adhesives are polyamide adhesives having excellent adhesive strength.

* * * * *

UNITED STATES PATENT AND TRADEMARK OFFICE
CERTIFICATE OF CORRECTION

PATENT NO. : 4,304,038

DATED : December 8, 1981

INVENTOR(S) : YOSHINORI YABU ET AL.

It is certified that error appears in the above—identified patent and that said Letters Patent is hereby corrected as shown below:

Column 2, line 46, change "FIGS. 1 to 10" to -- FIGS. 1 to 11 --;

Column 2, line 49, change "FIGS. 11 to 16" to -- FIGS. 12 to 16 --;

Column 3, line 16, change "and these flanges 4 and 5'" to -- and these flanges 4 and 4' --;

Column 3, line 42, change "(P x D/4)kg/cm$^2$" to -- (P x D/4)kg/cm --;

Column 11 (Claim 1), line 7, delete "4.00";

Column 12, line 43 (Claim 12), change "0.1 mm" to -- 0.2 mm --.

Signed and Sealed this

*Twenty-sixth* Day of *October 1982*

[SEAL]

*Attest:*

GERALD J. MOSSINGHOFF

*Attesting Officer* *Commissioner of Patents and Trademarks*